(12) United States Patent
Mackay et al.

(10) Patent No.: US 9,549,587 B1
(45) Date of Patent: Jan. 24, 2017

(54) HEAT MOLDED FOOTWEAR AND METHOD

(71) Applicants: Jamie Myles Mackay, Jackson, WY (US); Thomas Bryan Fay, Jackson, WY (US)

(72) Inventors: Jamie Myles Mackay, Jackson, WY (US); Thomas Bryan Fay, Jackson, WY (US)

(*) Notice: Subject to any disclaimer, the term of this patent is extended or adjusted under 35 U.S.C. 154(b) by 0 days.

(21) Appl. No.: 14/827,199

(22) Filed: Aug. 14, 2015

Related U.S. Application Data

(63) Continuation-in-part of application No. 14/478,631, filed on Sep. 5, 2014.

(51) Int. Cl.
| | | |
|---|---|---|
| *A43B 7/28* | (2006.01) | |
| *B29D 35/14* | (2010.01) | |
| *A43B 3/12* | (2006.01) | |
| *A43B 1/00* | (2006.01) | |
| *B29K 101/12* | (2006.01) | |

(52) U.S. Cl.
CPC . *A43B 7/28* (2013.01); *A43B 1/00* (2013.01); *A43B 3/12* (2013.01); *B29D 35/142* (2013.01); *B29K 2101/12* (2013.01)

(58) Field of Classification Search
CPC ....................................................... A43B 7/28
See application file for complete search history.

(56) References Cited

U.S. PATENT DOCUMENTS

| | | | | |
|---|---|---|---|---|
| 3,895,405 A | * | 7/1975 | Edwards | A43B 7/28 12/146 M |
| 2005/0126038 A1 | * | 6/2005 | Skaja | A43B 13/181 36/25 R |
| 2008/0052964 A1 | * | 3/2008 | Taylor | A43B 3/10 36/100 |
| 2008/0289219 A1 | * | 11/2008 | Nakano | A43B 13/186 36/88 |

* cited by examiner

*Primary Examiner* — Daniel Lee
(74) *Attorney, Agent, or Firm* — Michael D. Eisenberg

(57) ABSTRACT

A heat moldable footwear wherein the footwear is all one contiguous or uniform piece with no removable insoles or foot beds wherein only the top portion of the footwear is moldable.

4 Claims, 10 Drawing Sheets

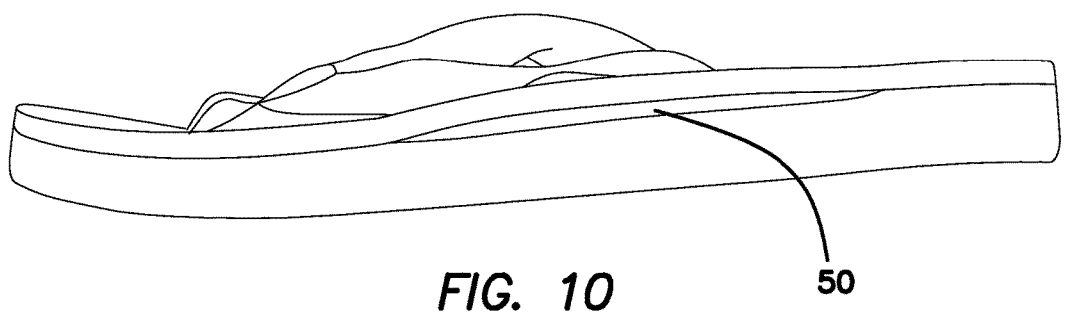
FIG. 10   50
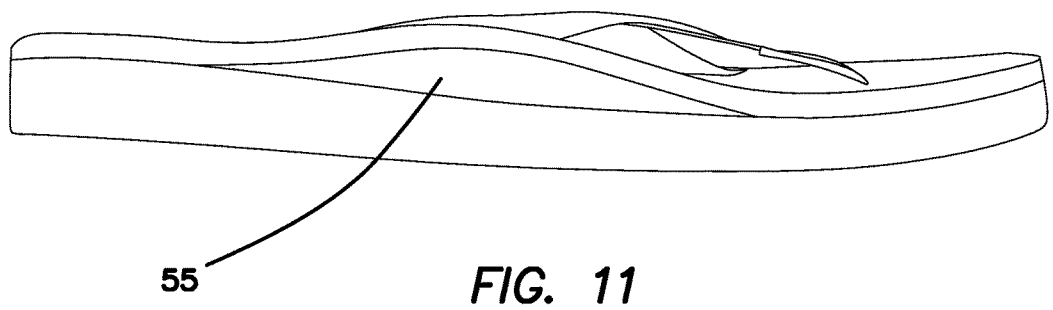
55   FIG. 11

HEAT MOLDED FOOTWEAR AND METHOD

CROSS-REFERENCES TO RELATED APPLICATIONS

This application is a continuation in part of application Ser. No. 14/478,631, filed Sep. 5, 2014 which is hereby incorporated herein by reference in the respective in its entirety.

TECHNICAL FIELD

The present invention relates generally to footwear and, more specifically, to customizable heat molded footwear having a heat moldable portion.

BACKGROUND OF THE INVENTION

The present invention relates generally to footwear and, more specifically, to customizable heat molded footwear having a heat moldable portion where the footwear is all one contiguous, monolithic uniform piece. When the heat molding takes place, it forms to the shape of one's foot through application of heat, thereafter, the user places the footwear on their feet for a predetermined period of time causing the footwear to mold to the shape of the underside and side portion of one's foot. There is nothing to be inserted or removed from the footwear in this present invention it is all one piece unlike other types of footwear wherein insoles and foot beds are removable.

The application of heat can be done using any heating device or heat application capable of sufficient temperature.

There are other footwear devices that provide for heat molding of orthopedic food beds and insoles that are removable from said footwear. While this footwear may be suitable for the purposes for which they were designed, they would not be as suitable for the purposes of the present invention as heretofore described. There is nothing to be inserted or removed from the footwear in this present invention it is all one piece unlike other types of footwear wherein insoles and foot beds are removable.

BRIEF SUMMARY OF EMBODIMENTS OF THE INVENTION

A primary object of the present invention is to provide users with heat moldable footwear wherein the footwear is all one contiguous or uniform piece with no removable insoles or foot beds wherein only the top plantar portion of the footwear is moldable.

Yet another object of the present invention is to provide heat moldable footwear that when heated to a predetermined temperature softens only the top layer sufficiently so the plantar portion of one's foot creates a specific mold of the user's foot. The user applies pressure to the heated foam or plastic. When cooling takes place, only the top layer foam or plastic permanently forms and takes the corresponding shape of the plantar and side portion of the foot when pressure is applied. The mid and bottom layers are unaffected during the molding process.

A further object of the present invention is to provide heat moldable flip flops or footwear having a strap or thong positioned between the big toe and long toe fixedly attached and divergently extending in a "Y" like formation to opposing sides of said flip-flops or footwear.

Still yet another object of the present invention is to provide heat moldable flip-flops or footwear wherein said strap or thong is not affected or deformed during said heat treatment.

Another object of the present invention is to provide heat moldable footwear wherein the sides, toecap, vamp, quarter, top line tongue, laces and any other part of the shoe above the sole is not affected or deformed during said heat treatment.

A further object of the present invention is to provide heat moldable footwear wherein the layers or layer of the bottom portion or sole of the footwear is unaffected during the molding process.

Additional objects of the present invention will appear as the description proceeds.

The present invention overcomes the shortcomings of the prior art by providing heat molded footwear in all one contiguous or uniform monolithic piece having a heat-moldable top portion enabling a user to mold the footwear to the shape of their plantar and side of the foot imprint through application of heat, using any heating device or heat application capable of sufficient temperature, where the user then places the footwear on their feet for a predetermined period of time causing the footwear to mold to the shape of the user's foot plantar and side portion.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

Figure 1:
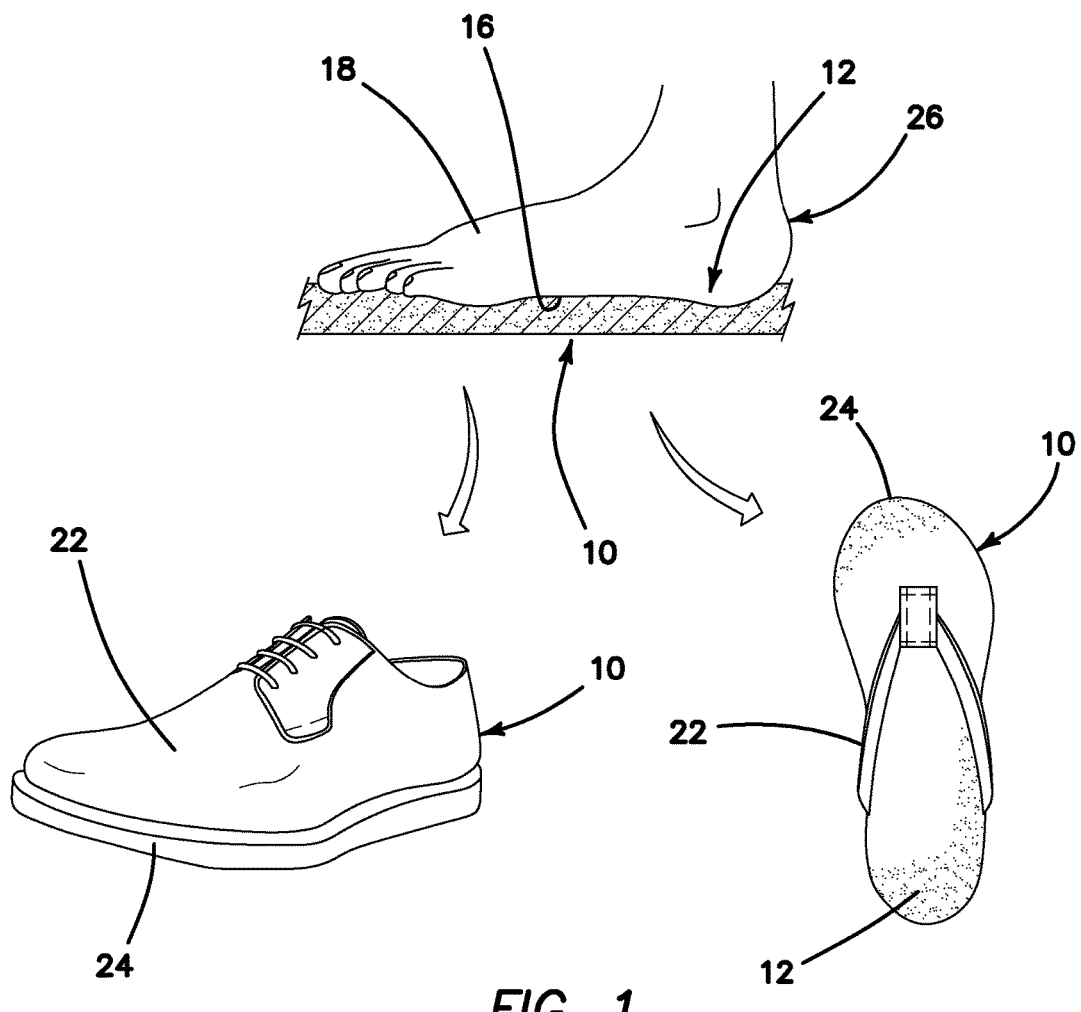

In order that the invention may be more fully understood, it will now be described, by way of example, with reference to the accompanying drawing in which:

FIG. 1 is an illustrative view of the heat molded footwear of the present invention.

Figure 2A:
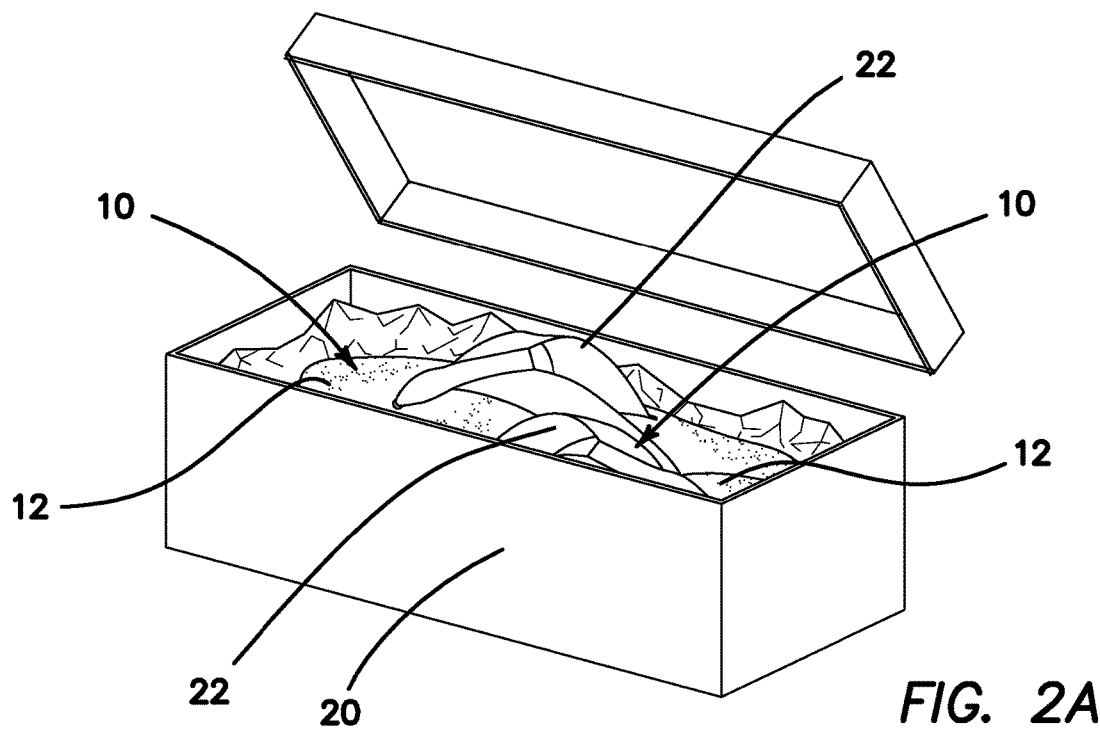

FIG. 2A is an illustrative view of the heat moldable footwear of the present invention.

Figure 2B:
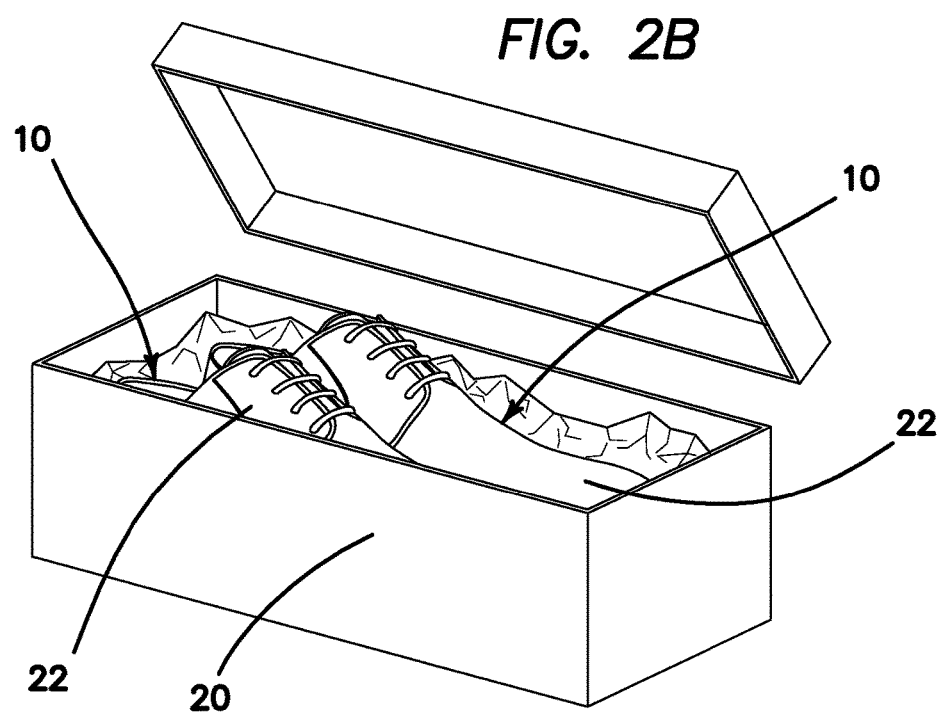

FIG. 2B is another illustrative view of the heat moldable footwear of the present invention.

Figure 3A:
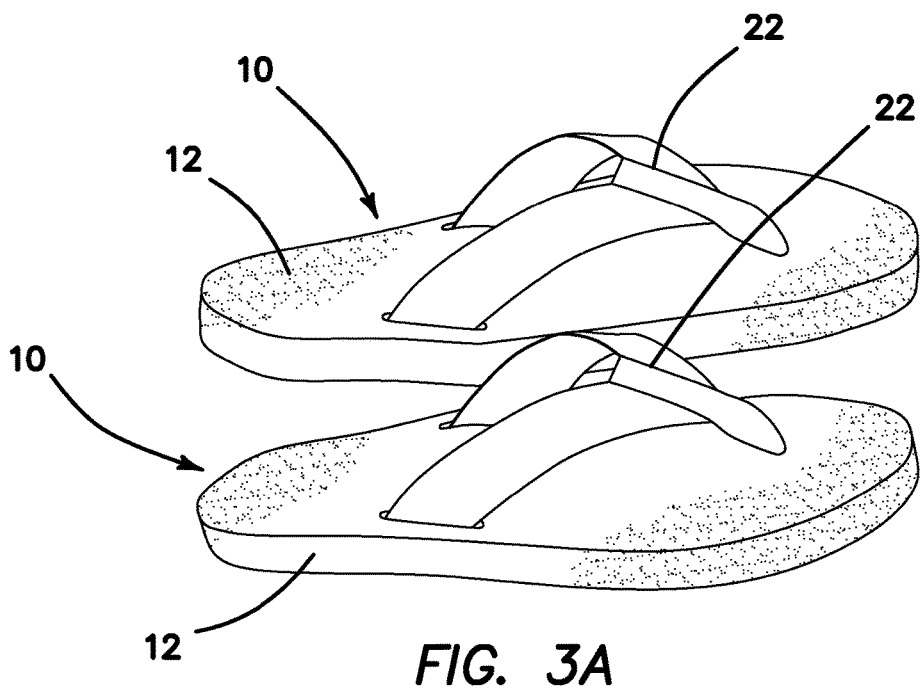

FIG. 3A is an illustrative view of an embodiment of the heat moldable footwear of the present invention.

Figure 3B:
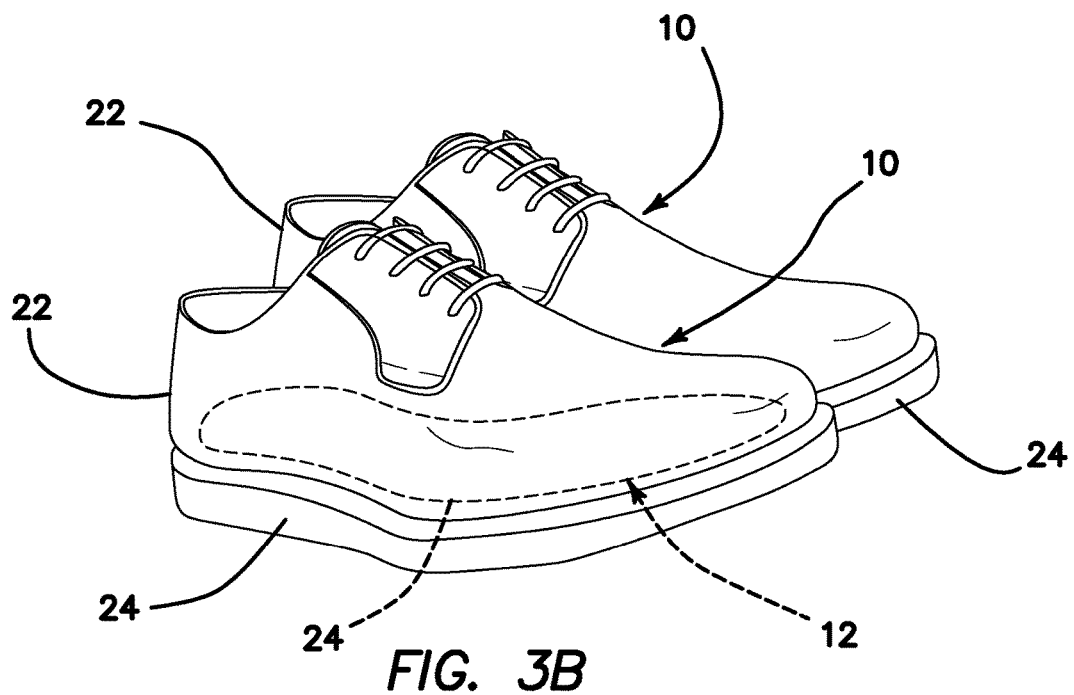

FIG. 3B is another illustrative view of an embodiment of the heat moldable footwear of the present invention.

Figures 4A, 4B:
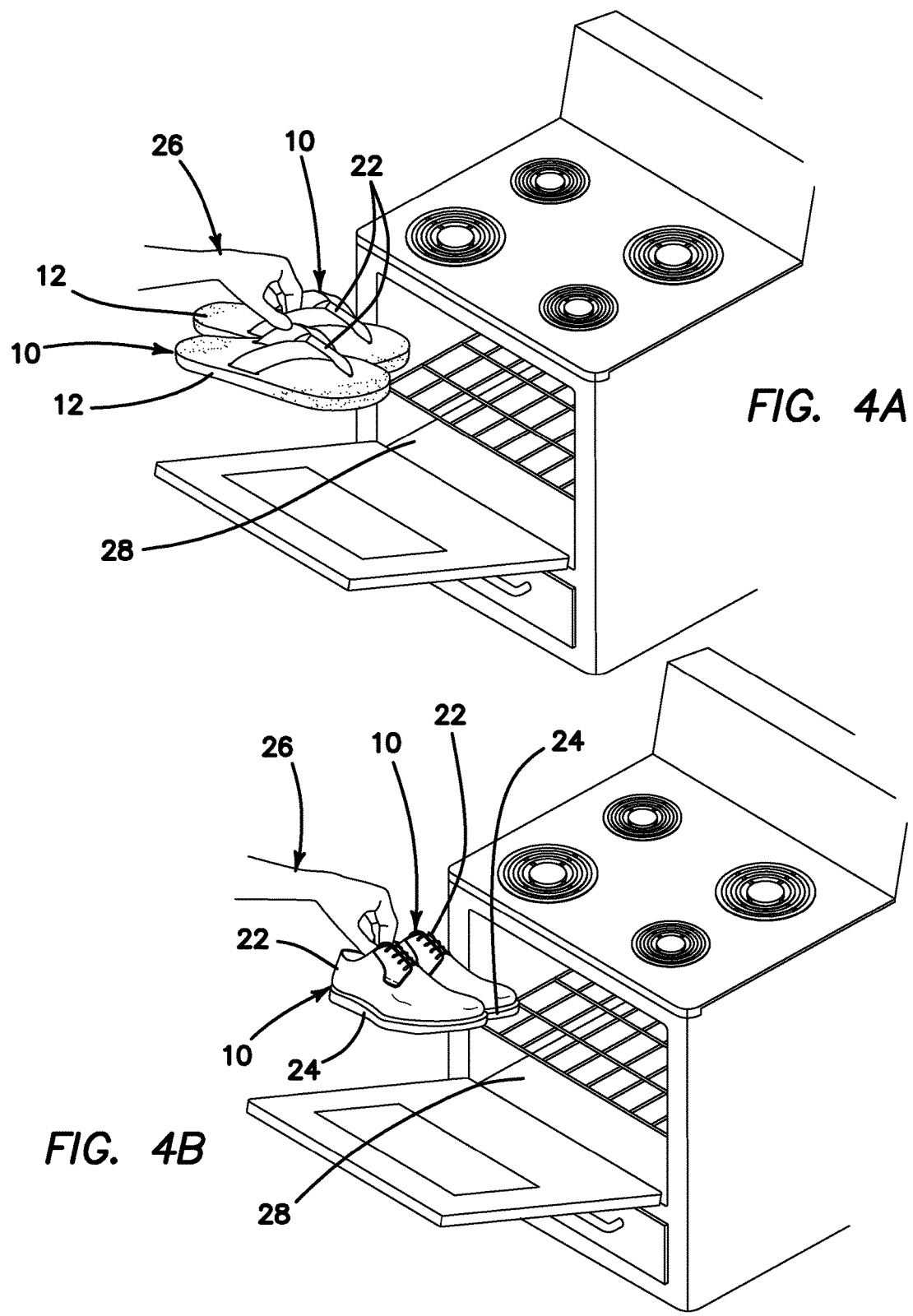

FIG. 4A is an illustrative view of an embodiment of a type of "heat treating" footwear having a heat heat-moldable foam or plastic.

FIG. 4B is another illustrative view of an embodiment of "heat treating" footwear having a heat heat-moldable foam or plastic.

Figures 5A, 5B:
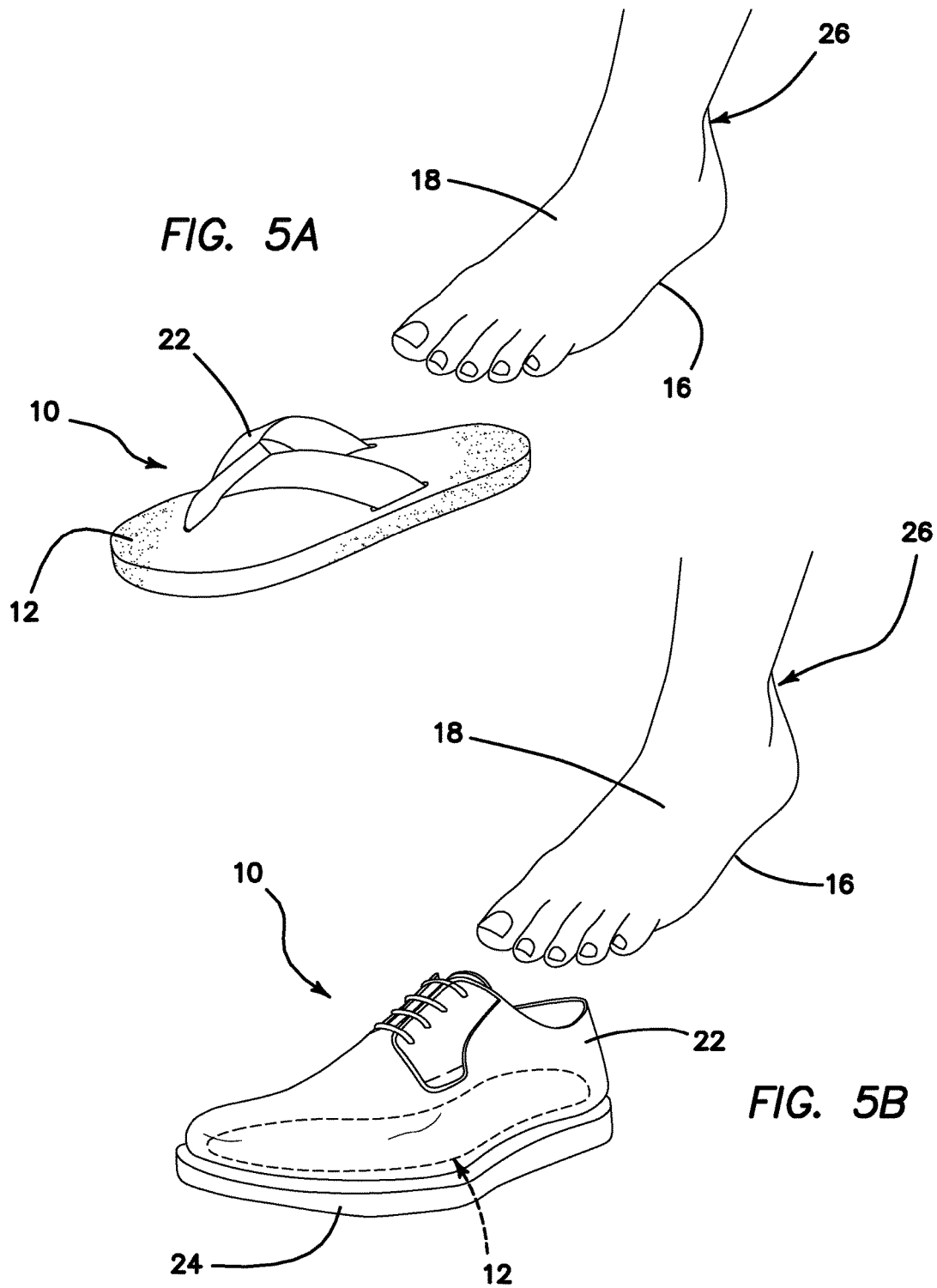

FIG. 5A is an illustrative view of an embodiment of flip-flops or footwear during the forming a permanent cast of a user's plantar foot imprint.

FIG. 5B is another illustrative view of an embodiment of the footwear during the forming a permanent cast of a user's plantar foot imprint.

Figure 6A:
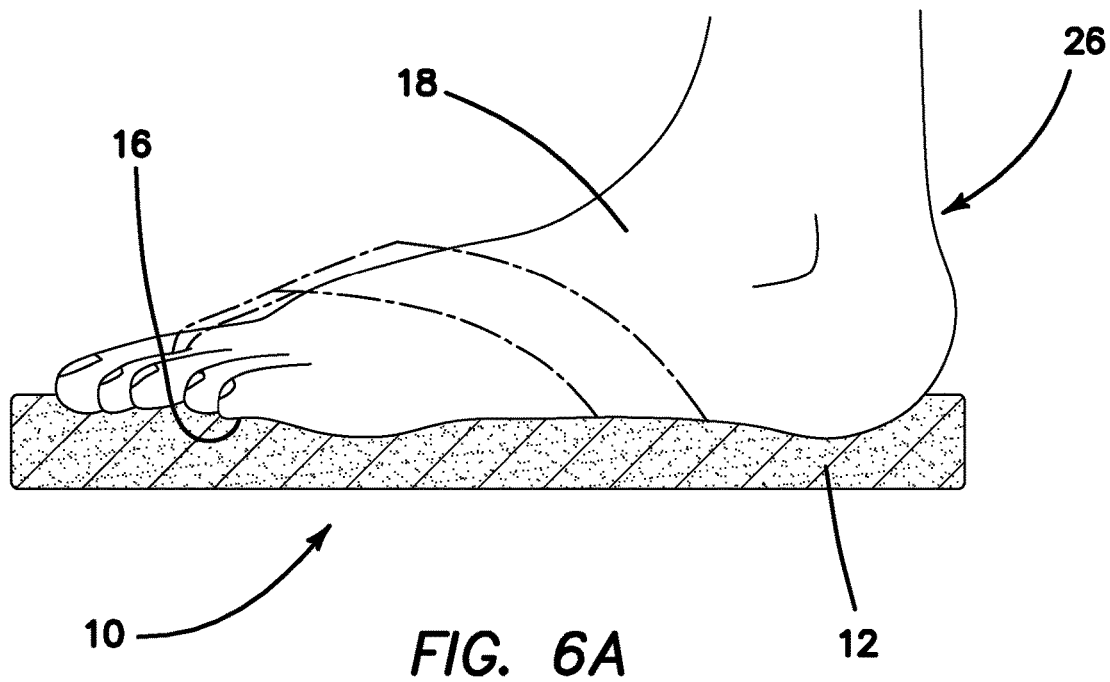

FIG. 6A is a cutaway view of an embodiment of flip-flops with a foot in the heat moldable flip-flops or footwear or of the present invention.

Figure 6B:
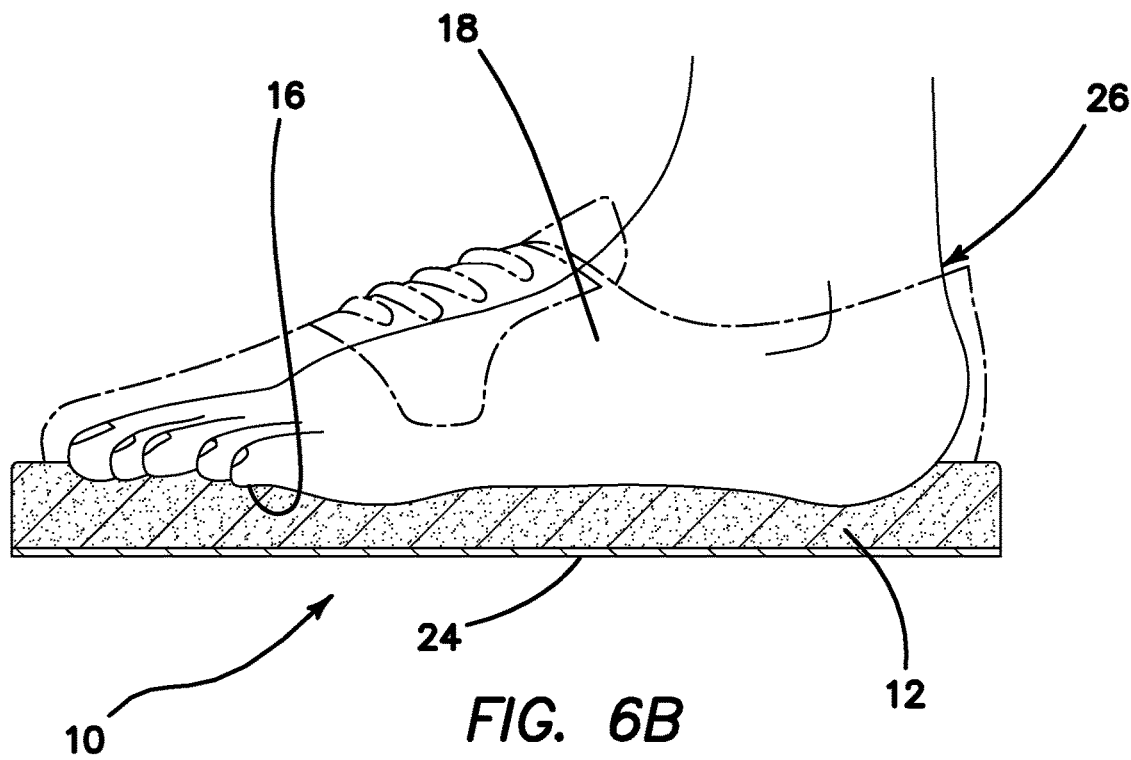

FIG. 6B is a cutaway view of an embodiment of footwear with a foot in the heat moldable flip-flops or footwear or of the present invention.

Figure 7A:
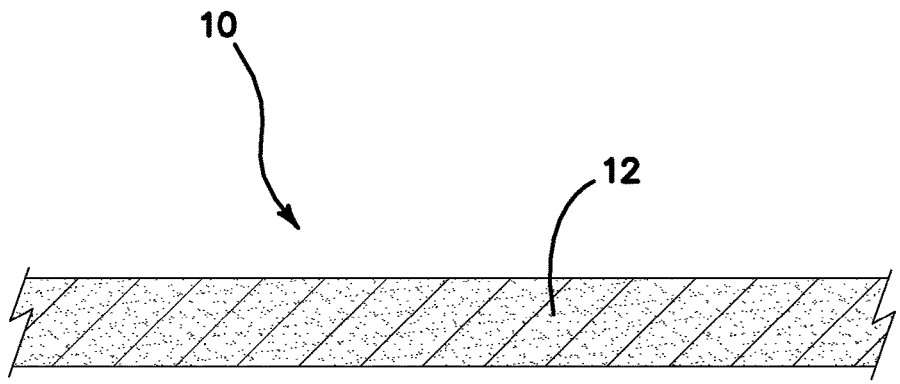

FIG. 7A is an illustrative view of the contiguous monolithic Heat-moldable foam or plastic cast before being formed to a user's plantar foot imprint.

Figure 7B:
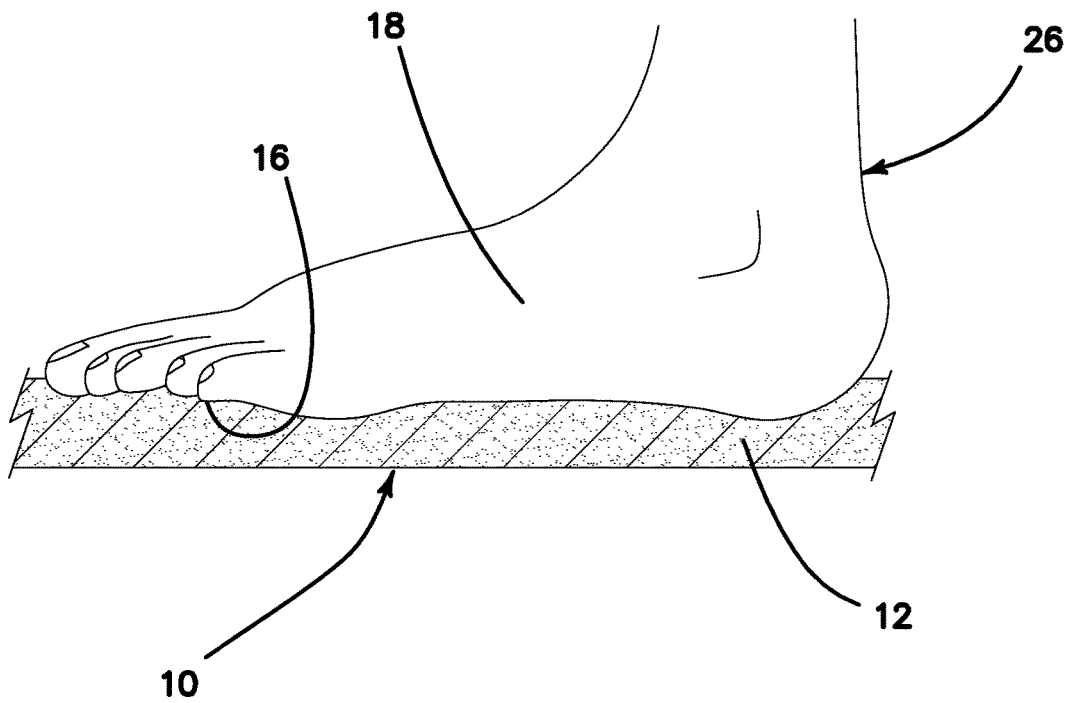

FIG. 7B is another illustrative view of the contiguous monolithic Heat-moldable foam or plastic cast to form a user's plantar foot imprint.

Figure 8:
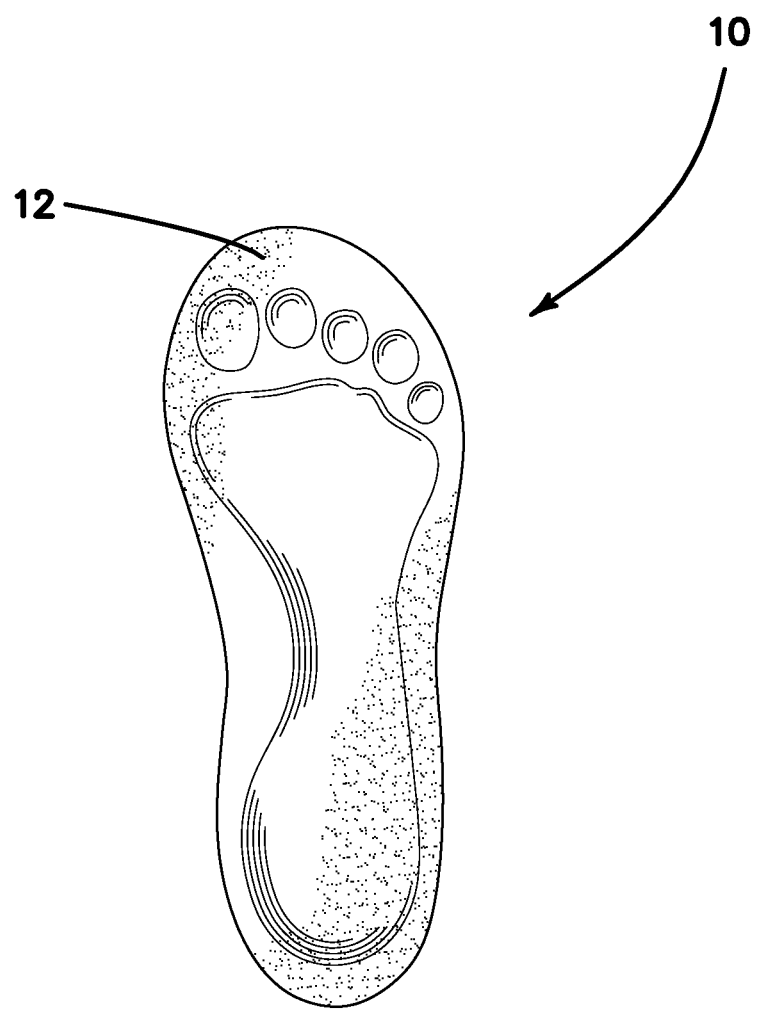
Figure 9:
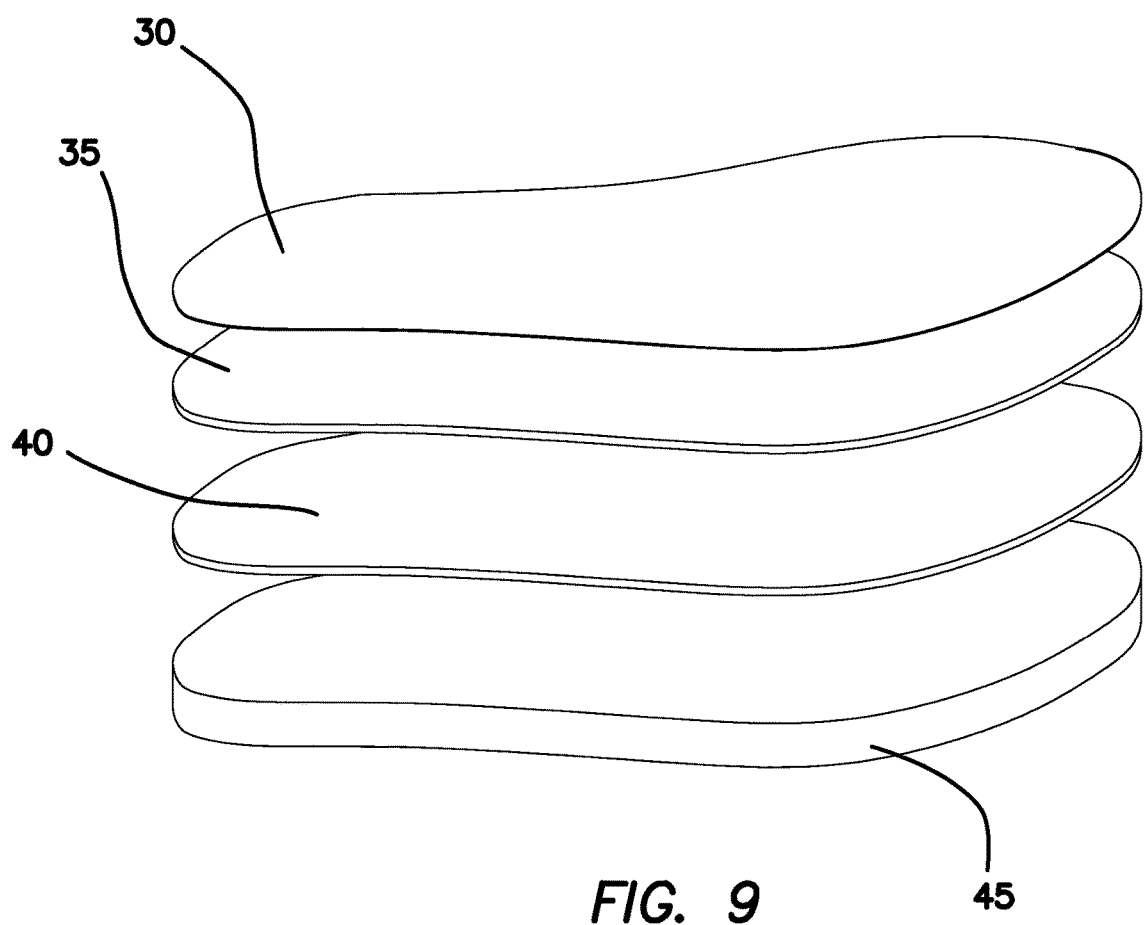

FIG. 8 is a top plan view of the user's plantar foot imprint after the mold has been formed into the continuous monolithic moldable footwear.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Turning now descriptively to the drawings, in which similar reference characters denote similar elements throughout the several views, the Figures illustrate the heat molded flip-flops or footwear of the present invention. With regard to the reference numerals used, the following numbering is used throughout the various drawing figures.

10 heat molded flip flops or footwear
12 heat-moldable foam or plastic portion of footwear 10
16 plantar surface of foot 18
18 foot
20 packaging for heat molded footwear 10
22 "Y" like formation or thong 22
24 Sole of shoe
26 user
28 oven The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Referring to FIGS. 2A and 2B, shown are illustrative views of the heat moldable footwear of the present invention. The present invention provides footwear 10 with a moldable foam/plastic portion 12 that can be shaped to the user's plantar surface 16 of the foot 18. The first step of preparing the heat molded footwear 10 is to remove the footwear 10 from its packaging 20 prior to molding.

Referring to FIGS. 3A and 3B, shown are illustrative views of embodiments of the heat moldable flip-flops or footwear of the present invention. The illustrated heat moldable flip-flops or footwear 10 comprises a "Y" like formation or thong 22 with a heat-moldable foam or plastic portion 12 that would be heat treated prior to user casting.

Referring to FIGS. 4A and 4B, shown are illustrative views of embodiments of heat treating footwear having a heat-moldable foam or plastic. The present invention incorporates a heat-moldable foam or plastic portion 12 that enables a user 26 to create a footwear support conforming to the plantar surface 16 of the foot 18 by heat treating the footwear 10 in an oven 28 to a desired temperature for a predetermined period of time. The user 26 then places the footwear 10 on their feet 18 and stands erect and immobile for a predetermined period of time, while the foam or plastic portion 12 is permanently cast into a mold of the plantar surface 16 of the user's foot 18.

Referring to FIGS. 5A and 5B, shown are illustrative views of embodiments of forming a permanent cast of a user's plantar foot imprint. As aforementioned, the present invention incorporates a monolithic heat-moldable foam or plastic portion 12 that enables a user 26 to create a footwear support conforming to the plantar surface 16 of the foot 18 by heat treating the footwear 10 to a desired temperature for a predetermined period of time. The user 26 then places the footwear 10 on the feet 18 and stands erect and immobile for a few minutes while the foam or plastic portion 12 is permanently cast into a mold of the plantar surface 16 of the user's foot.

Referring to FIG. 7, shown is an illustrative view of a heat-moldable foam or plastic cast to form a user's plantar foot imprint. The heat molded footwear 10 provides the foam or plastic portion 12 having an orthocasting for producing a mold of the plantar surface 16 of the foot 18 that conforms to the user's foot pad as shown. FIG. 8 illustrates the user's plantar foot imprint after the mold has been formed.

In a another embodiment, the method of heat molding footwear, comprises providing the user a thermal barrier sock or protective barrier to guard the user's foot from temperature or burning during the molding process.

It will be understood that each of the elements described above, or two or more together may also find a useful application in other types of methods differing from the type described above.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. In addition, when a single callout line in the drawings leads to two or more separate reference numbers (first, second, etc. reference numbers), (and each reference numeral refers to a different piece of text in the detailed description) and it would be inconsistent to designate the drawing item being called out as both pieces of text, the drawing be interpreted as illustrating two different variants. In one variant, the drawing item is referred to by the first reference number and in another variant the drawing item is referred to by the second reference number, etc.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether CTRL logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of heat molding footwear, comprising the steps of:
   a) providing footwear with a contiguous or uniform heat-moldable portion formed of a heat-moldable material, wherein nothing is removable or detachable;
   b) heating the footwear to a temperature in which the heat-moldable portion becomes soft and moldable;
   c) placing a foot of a user into the footwear;
   d) pressing a plantar surface of the foot onto the heated heat-moldable portion for a predetermined period of time; and
   e) allowing the heat-moldable portion to cool wherein the heat-moldable portion conforms to the shape of the plantar surface of the user's foot;
   wherein the footwear comprises one continuous monolithic piece.

2. The method of claim 1, wherein step b) comprises heating with any heating device or heat application capable of sufficient temperature to make the heat-moldable material portion soft and moldable.

3. The method of claim 1, wherein the footwear comprises flip-flops, and the method further provides a strap or thong manufactured and positioned between a big toe and a long toe fixedly attached and divergently extending in a "Y"-like formation and made of a material that will not deform during the heat treatment.

4. The method of claim 1,
   wherein after heat molding and cooling takes place, the heat moldable material permanently conforms to the shape of the user's foot.

* * * * *